(12) United States Patent
Howlett et al.

(10) Patent No.: US 8,717,870 B2
(45) Date of Patent: May 6, 2014

(54) DIGITAL LOAD-SHARING TO ENHANCE THE REDUNDANCY AND FLEXIBILITY OF CHANNEL DISTRIBUTION IN A MULTIPLE-CHANNEL MULTIPLE-PORT CATV UPCONVERTER/MODULATOR

(75) Inventors: Colin Howlett, Victoria (CA); Gerald Harron, Martensville (CA); Michael Jaspar, Victoria (CA)

(73) Assignee: Vecima Networks Inc., Victoria, BC (CA)

( * ) Notice: Subject to any disclaimer, the term of this patent is extended or adjusted under 35 U.S.C. 154(b) by 189 days.

(21) Appl. No.: 13/016,383

(22) Filed: Jan. 28, 2011

(65) Prior Publication Data

US 2011/0188584 A1      Aug. 4, 2011

Related U.S. Application Data

(60) Provisional application No. 61/300,686, filed on Feb. 2, 2010.

(51) Int. Cl.
*H04L 12/26* (2006.01)

(52) U.S. Cl.
USPC .......... 370/216; 370/225; 370/257; 370/359; 370/362

(58) Field of Classification Search
None
See application file for complete search history.

(56) References Cited

U.S. PATENT DOCUMENTS

| 6,385,203 | B2 * | 5/2002 | McHale et al. | 370/401 |
|---|---|---|---|---|
| 6,598,229 | B2 * | 7/2003 | Smyth et al. | 725/107 |
| 7,552,192 | B2 * | 6/2009 | Carmichael | 709/217 |
| 8,254,368 | B2 * | 8/2012 | Huber et al. | 370/350 |
| 2011/0072454 | A1 * | 3/2011 | Gordon et al. | 725/28 |

* cited by examiner

*Primary Examiner* — Willie J Daniel, Jr.
(74) *Attorney, Agent, or Firm* — Adrian D. Battiso; Ade & Company Inc.

(57) ABSTRACT

A method of channel-to-port assignment is described where the distribution of channels is performed in the digital domain of the CATV/QAM upconverter/modulator. This channel distribution allows for the possibility of simple failover, power combining of multiple outputs, and a fine granularity of channel to port mapping, QAM or analog channel, in a multi-port device.

10 Claims, 2 Drawing Sheets

DIGITAL LOAD-SHARING TO ENHANCE THE REDUNDANCY AND FLEXIBILITY OF CHANNEL DISTRIBUTION IN A MULTIPLE-CHANNEL MULTIPLE-PORT CATV UPCONVERTER/MODULATOR

This application claims the benefit under 35 USC 119 of the priority of Provisional Application No. 61/300,686 filed Feb. 2, 2010, the disclosure of which is incorporated herein by reference.

This invention relates to an arrangement for digital load-sharing to enhance the redundancy and flexibility of channel distribution in a multiple-channel multiple-port CATV upconverter/modulator. The invention can be applied to both QAM modulated signals and analog modulated signals such as NTSC, PAL etc.

BACKGROUND OF THE INVENTION

Details of the CATV modulator are well known to persons skilled in this art and can be located from many prior documents describing the operation of these arrangements. Extensive details are available in the Technical Reports available from Cable Television Laboratories Inc and particularly the reports entitled Data-Over Cable Service Interface Specifications Modular Headend Architecture which is CM-TR-MHA-V02-081209 copyright 2008; and Data-Over Cable Service Interface Specifications which is CM-TR-CMAP-V01-101222 copyright 2010.

These documents are published and available on line from their web site at Cablelabs.com. The disclosure of the above documents is hereby incorporated by reference.

In an analog CATV or QAM service deployment, it is often necessary to combine the outputs of multiple upconversion paths in order to meet the transmission bandwidth needs of a particular node or service group. Switching of signals or data is performed prior to the upconversion process. External RF switching or combination of the upconverted channel groups is also performed. This system of switching and combination does not allow for the dynamic reassignment of channels to the available upconversion paths or "ports", nor does it allow for the aggregation of the total channel capacity of the system to one port.

Another characteristic weakness of this approach is that of failover. Typically, redundant upconversion modules are present in the deployment and are switched into the signal path upon the detected failure of another upconversion module. This process of failing over to an alternate upconversion path is relatively slow and results in a loss of data or interruption of service.

SUMMARY OF THE INVENTION

According to the invention there is provided an apparatus for signal modulation for transmission on a CATV cable comprising:

a plurality of ports for receiving input data;

each port having associated therewith a respective one of a plurality of processing blocks each acting as a signal generator and each arranged for generating from the digital input data signals to be transmitted on the CATV cable to recipients;

each generator being associated with a respective one of a plurality of upconversion paths, where each upconversion path includes an output for transmission on the cable;

and a data bus connecting available output data between the processing blocks such that a distribution of channels is performed in the digital domain of the upconverter/modulator on the digital signals from the processor blocks.

Preferably the processor blocks are arranged to operate on analog CATV channels or on QAM channels.

Preferably distribution of channels to the upconversion paths is accomplished by the data bus which contains samples of channel data, real or complex, as individual channels at a specific center frequency or as a block of multiple channels with arbitrary placement across a certain bandwidth.

Preferably data received by a processing block across the data bus is combined with internal signals before being output to the upconversion path.

Preferably routing of data across the data bus occurs after the majority of signal processing in the processing blocks has been accomplished such that additional resources and latency required in the processing blocks to support the extra data arriving on the data bus is minimal.

Preferably routing/sharing of data across the data bus allows for arbitrary assignment of channels to ports.

Preferably routing/sharing of data across the data bus enables allocation of all channel resources to a single port.

Preferably routing/sharing of data across the data bus enables mixing of QAM and CATV channels at the same output.

Preferably routing/sharing of data across the data bus enables rapid and glitchless failover from one upconversion path to another should a failure be detected.

Preferably routing/sharing of data across the data bus enables the emulation of a gain stage by assigning phase-locked channels to multiple ports whose outputs are summed.

Preferably routing/sharing of data across the data bus enables a fine granularity of channel to port mapping down to individual channels.

This invention presents an upconverter architecture where signal and data switching is incorporated between signal processing and where upconversion and RF switching/combining is incorporated prior to the module output.

Support for glitchless failover is possible using these functional additions. The output adders may be used to allocate the channel resources of multiple upconversion paths to one output port. In cases where the same data or source signal is input to multiple processing blocks, the outputs of multiple upconversion paths may be summed to emulate additional gain stages for the system.

DETAILED DESCRIPTION

Figure 1:
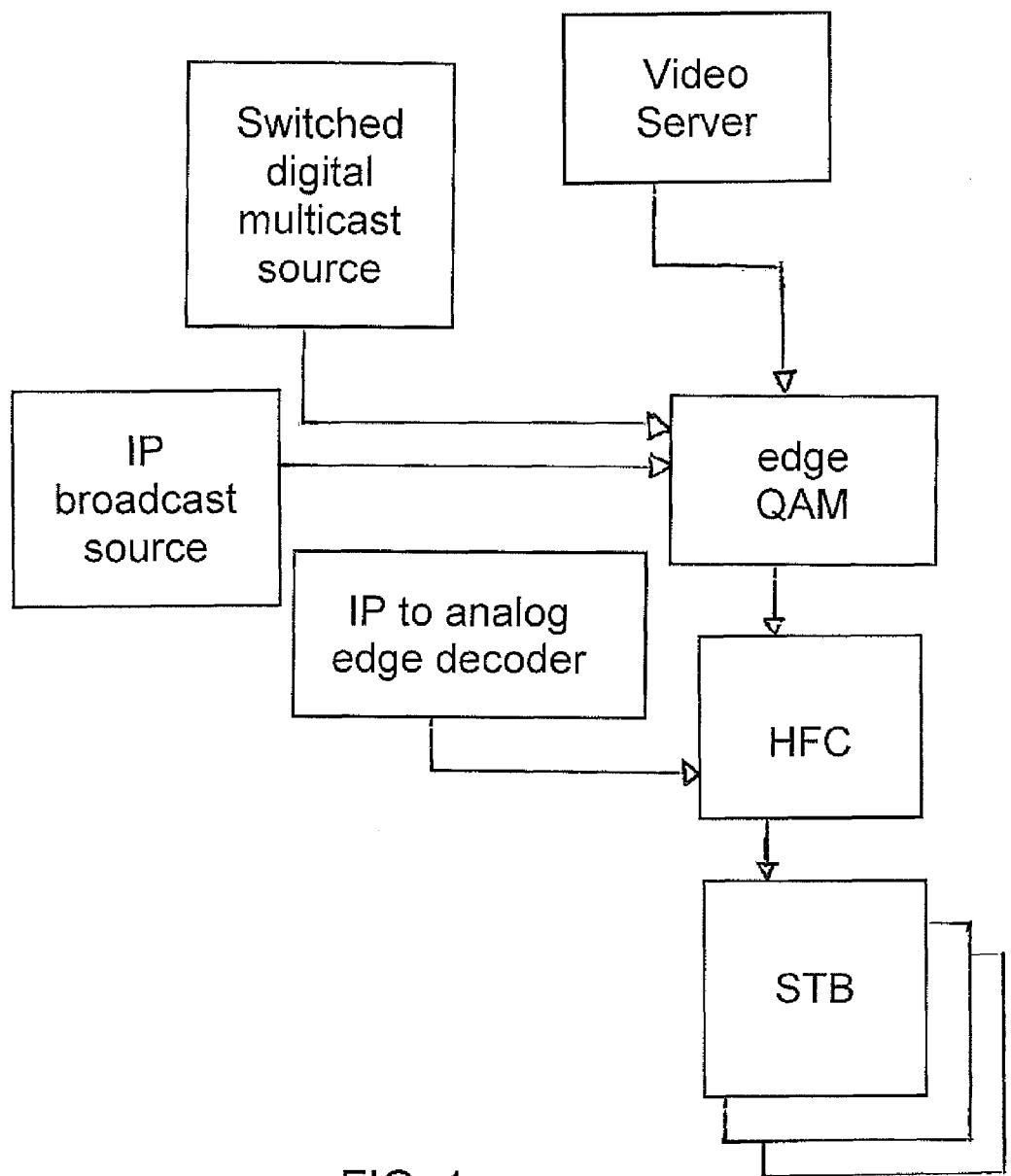
FIG. 1 is a general block diagram of an analog CATV or QAM system such as what would be employed for modulation and upconversion in a cable video headend.

Reference is made to the above documents and particularly FIG. 5-1 of the first document. This shows MPEG, SPTS or MPTS via UDP/IP multiplexed onto MPTS input to mod/upx into the Headend combining HFC (Hybrid fiber-coax) network which serves set-top boxes in customer homes.

FIG. 5-3 M-CMTS, reference architecture, from the second document provide a similar disclosure.

FIG. 1 is a general block diagram of an analog CATV or QAM system such as what would be employed for modulation and upconversion in a cable video headend. MPEG, SPTS or MPTS are input from a variety of sources. Some are converted to an analog video channel through an edge decoder in the analog CATV case. Others are encoded and mapped to a digital QAM channel in an edge QAM in the QAM case. In either of the edge decoder or edge QAM, channels are upconverted and output onto a combining network for delivery to customer premises.

Figure 2:
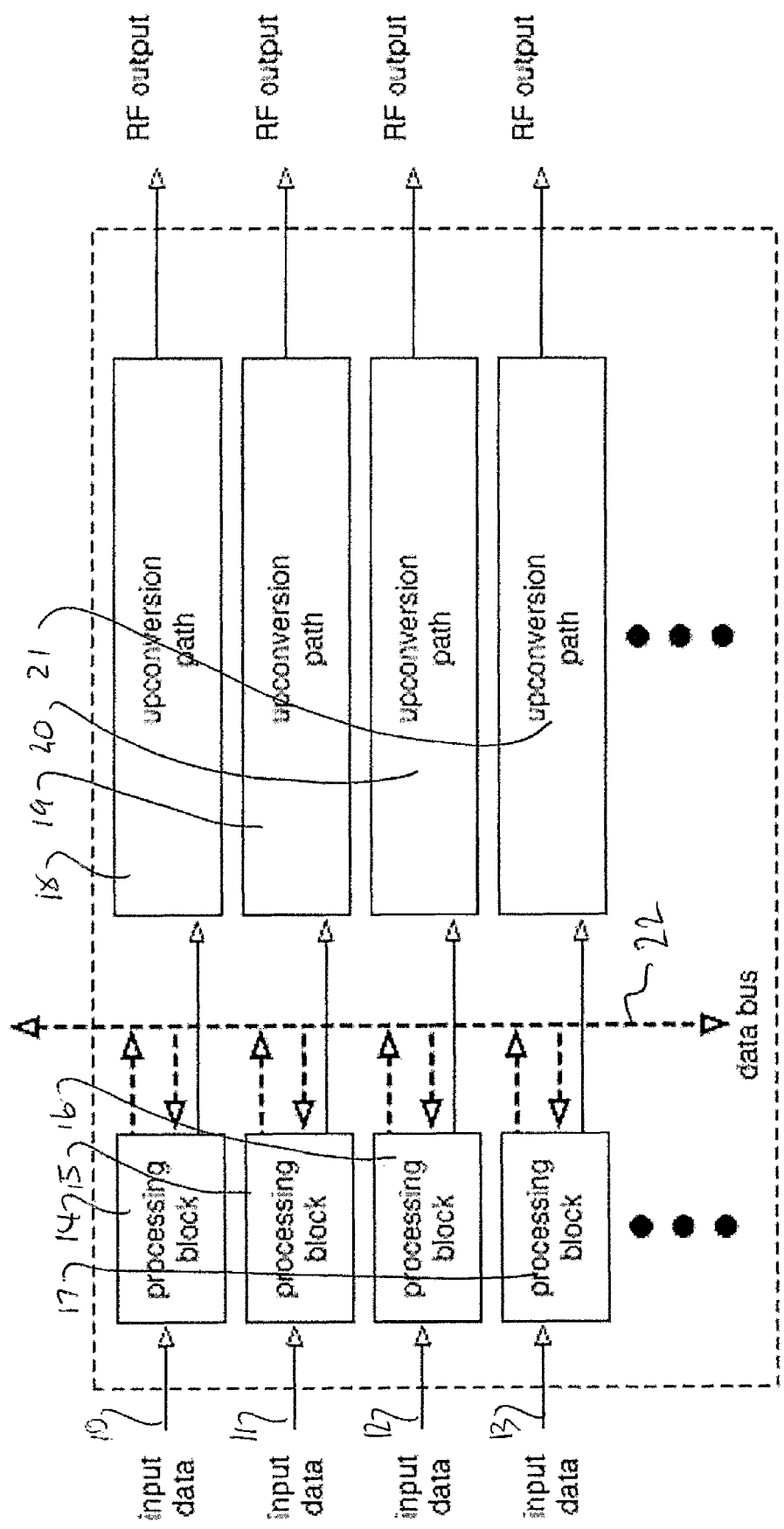
FIG. 2 is a diagram showing a data bus for sharing signal data between multiple processing blocks and optional output adders which, when enabled, combine the outputs of multiple upconversion paths.

In FIG. 2 is shown an apparatus for signal modulation for transmission on a CATV cable comprising a plurality of ports 10, 11, 12, 13 for receiving input data. Each port supplies the signals to a respective one of a plurality of processing blocks 14, 15, 16, and 17, each acting as a signal generator and each arranged for generating from the digital input data signals to be transmitted on the CATV cable to recipients. Each generator is associated with a respective one of a plurality of upconversion paths 18, 19, 20 and 21, where each upconversion path includes an RF output for transmission on the cable. A data bus 22 is provided connecting available output data between the processing blocks 14, 15, 16 and 17 such that a distribution of channels is performed in the digital domain of the upconverter/modulator on the digital signals from the processor blocks.

The processor blocks are arranged to operate on analog CATV channels or on QAM channels.

The data bus is arranged such that the distribution of channels to the upconversion paths is accomplished by the data bus which contains samples of channel data, real or complex, as individual channels at a specific center frequency or as a block of multiple channels with arbitrary placement across a certain bandwidth.

The data bus is arranged such that data received by a processing block across the data bus is combined with internal signals before being output to the upconversion path.

The data bus is arranged such that routing of data across the data bus occurs after the majority of signal processing in the processing blocks has been accomplished such that additional resources and latency required in the processing blocks to support the extra data arriving on the data bus is minimal.

The data bus includes switching systems 23 responsive to the data and the channel allocations to carry out the following:

The data bus is arranged such that routing/sharing of data across the data bus allows for arbitrary assignment of channels to ports.

The data bus is arranged such that routing/sharing of data across the data bus enables allocation of all channel resources to a single port.

The data bus is arranged such that routing/sharing of data across the data bus enables mixing of QAM and CATV channels at the same output.

The data bus is arranged such that routing/sharing of data across the data bus enables rapid and glitchless failover from one upconversion path to another should a failure be detected.

The data bus is arranged such that routing/sharing of data across the data bus enables the emulation of a gain stage by assigning phase-locked channels to multiple ports whose outputs are summed.

The data bus is arranged such that routing/sharing of data across the data bus enables a fine granularity of channel to port mapping down to individual channels.

The multiple generation/processing modules have a maximum capacity of 'M' channels which may be a mixture of CATV/QAM channels. These 'M' channels, through the use of the digital data bus, may be arbitrarily routed to 'N' ports. This flexible placement of 'M' channels across 'N' ports reduces the need for input and output switching in CATV/QAM service deployments. Rather than the output ports connecting to an RF combiner through lossy cables and hardware, the channels may be combined internal to the module. On the input side, there is less switching needed also. All of the necessary data for an arbitrary number of channels may be sent to the module and the digital data bus may handle any switching required for reallocation of channels or for failover.

The presented architecture allows for much faster failover from one port to another when a failure is detected. This would result in less loss of data than conventional detection and failover schemes. If a failure was detected in a given upconversion path, the channel data processed by the corresponding signal processing block may be routed through the data bus to another signal processing block and upconversion path with minimal delay since the data is already processed. The processing block and failed upconversion path may be easily kept in a synchronized state with the carriers and data rates of a backup processing block and upconversion path. Under these circumstances the failover would be seamless with only a brief gap in data transmission due to detection and switching. Under certain detection and switching schemes the failover could be made to be glitchless with no loss of data or interruption of service.

A channel assigned to multiple upconversion paths, whose individual outputs were summed to form the system output, would be of an increased signal level, emulating a gain stage and being more resistant to glitches during failover. The two or more in-phase paths summed together constructively would be indistinguishable from the output due to a single upconversion path. Loss of one of the upconversion paths due to failure would result in only a small, correctable glitch due to the change in power at the receiver, but the channel would remain consistently present at the output.

Due to the connection of one processing module to others, the sharing of channels or mapping of channels to one or more ports may be accomplished with a fine granularity of even one channel. This requires only that the processing modules at some point operate on individual channels prior to their output to the upconversion paths. The sharing of single channels or groups of channels is limited only by the resources of the processing module dedicated to performing signal processing on signals received over the data bus.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. Apparatus for signal modulation for transmission on a CATV (cable television) cable comprising:
    a plurality of ports for receiving input data;
    each port having associated therewith a respective one of a plurality of processing blocks each acting as a signal generator and each arranged for generating, from the digital input data, digital or analog CATV channels to be transmitted on the CATV cable to recipients;
    each generator being associated with a respective one of a plurality of upconversion paths, where each upconversion path includes an output for transmission on the cable;
    and a data bus arranged to receive the digital signals generated by the processing blocks for connecting available output data between the processing blocks;

such that a distribution of channels is performed in the digital domain of the upconversion paths on the digital signals from the processor blocks;

and such that digital data from a processing block across the data bus is combined with internal CATV channel signals of another processing block before being output to the upconversion path;

and wherein routing of data across the data bus occurs after the majority of signal processing of the formation of individual or groups of CATV channels across a certain bandwidth in the processing blocks has been accomplished.

2. The apparatus according to claim 1 wherein the processor blocks are arranged to operate on analog CATV channels or on QAM (quadrature amplitude modulation) channels.

3. The apparatus according to claim 1 wherein the distribution of channels to the upconversion paths is accomplished by the data bus which contains samples of channel data, real or complex, as individual channels at a specific center frequency or as a block of multiple channels with arbitrary placement across a certain bandwidth.

4. The apparatus according to claim 1 wherein said routing of data across the data bus which occurs after the majority of signal processing in the processing blocks has been accomplished is arranged such that additional resources and latency required in the processing blocks to support the extra data arriving on the data bus is minimal.

5. The apparatus according to claim 1 wherein said routing/sharing of data across the data bus is arranged to allow for arbitrary assignment of channels to ports.

6. The apparatus according to claim 1 wherein said routing/sharing of data across the data bus is arranged to enable allocation of all channel resources to a single port.

7. The apparatus according to claim 1 wherein said routing/sharing of data across the data bus is arranged to enable mixing of QAM and CATV channels at the same output.

8. The apparatus according to claim 1 wherein said routing/sharing of data across the data bus is arranged to enable rapid and glitchless failover from one upconversion path to another should a failure be detected.

9. The apparatus according to claim 1 wherein said routing/sharing of data across the data bus is arranged to enable the emulation of a gain stage by assigning phase-locked channels to multiple ports whose outputs are summed.

10. The apparatus according to claim 1 wherein said routing/sharing of data across the data bus is arranged to enable a fine granularity of channel to port mapping down to individual channels.

\* \* \* \* \*